(12) United States Patent
Kubo (10) Patent No.: US 11,402,717 B2
(45) Date of Patent: Aug. 2, 2022

(54) ELECTROCHROMIC MIRROR

(71) Applicant: CANON KABUSHIKI KAISHA, Tokyo (JP)

(72) Inventor: Wataru Kubo, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 265 days.

(21) Appl. No.: 16/686,936

(22) Filed: Nov. 18, 2019

(65) Prior Publication Data

US 2020/0089072 A1 Mar. 19, 2020

Related U.S. Application Data

(63) Continuation of application No. PCT/JP2018/021330, filed on Jun. 4, 2018.

(30) Foreign Application Priority Data

Jun. 8, 2017 (JP) .............................. JP2017-113620

(51) Int. Cl.
| | | |
|---|---|---|
| *G02F 1/157* | (2006.01) | |
| *B60R 1/08* | (2006.01) | |
| *B60R 1/12* | (2006.01) | |
| *G02F 1/153* | (2006.01) | |
| *G02F 1/155* | (2006.01) | |
| *G02F 1/163* | (2006.01) | |

(52) U.S. Cl.
CPC .............. *G02F 1/157* (2013.01); *B60R 1/088* (2013.01); *B60R 1/12* (2013.01); *G02F 1/155* (2013.01); *G02F 1/1533* (2013.01); *G02F 1/163* (2013.01); *B60R 2001/1223* (2013.01)

(58) Field of Classification Search
CPC ........ G02F 1/157; G02F 1/1533; G02F 1/155; G02F 1/163; B60R 2001/1223; B60R 1/088; B60R 1/12
USPC .......................... 359/237, 238, 240, 245, 265
See application file for complete search history.

(56) References Cited

U.S. PATENT DOCUMENTS

| | | | | |
|---|---|---|---|---|
| 4,603,946 | A * | 8/1986 | Kato ...................... | B60R 1/088 349/116 |
| 10,344,208 | B2 * | 7/2019 | Vasiliev .................. | G02F 1/155 |
| 2015/0314731 | A1 * | 11/2015 | Popp ....................... | G02F 1/157 359/267 |

FOREIGN PATENT DOCUMENTS

| | | |
|---|---|---|
| CN | 202174995 U | 3/2012 |
| EP | 1442932 A1 | 8/2004 |
| JP | 59-170824 U | 11/1984 |
| JP | 2-78928 U | 6/1990 |
| JP | 2-142823 U | 12/1990 |
| JP | 8-62641 A | 3/1996 |

(Continued)

*Primary Examiner* — Tuyen Tra
(74) *Attorney, Agent, or Firm* — Canon U.S.A., Inc. IP Division (57) ABSTRACT

The present disclosure provides an electrochromic mirror including a light reflective member, and an electrochromic device disposed on the reflective surface side of the light reflective member, wherein the electrochromic mirror includes a light detection region, the light detection region includes a plurality of openings defined in the light reflective member or a light transmissive member disposed between a bezel member and the light reflective member, and the electrochromic mirror is configured to control a transmittance of the electrochromic device in response to at least a portion of the amount of light in the light detection region.

16 Claims, 9 Drawing Sheets

(56) References Cited

FOREIGN PATENT DOCUMENTS

| | | |
|---|---|---|
| JP | 8-106110 A | 4/1996 |
| JP | 08-507020 A | 7/1996 |
| JP | 2004-168279 A | 6/2004 |
| JP | 2005-316509 A | 11/2005 |
| JP | 2006-526176 A | 11/2006 |
| JP | 2014-19241 A | 2/2014 |
| JP | 2016-507409 A | 3/2016 |

* cited by examiner

FIG. 8A (III)

ELECTROCHROMIC MIRROR

CROSS-REFERENCE TO RELATED APPLICATIONS

This application is a Continuation of International Patent Application No. PCT/JP2018/021330, filed Jun. 4, 2018, which claims the benefit of Japanese Patent Application No. 2017-113620, filed Jun. 8, 2017, both of which are hereby incorporated by reference herein in their entirety.

TECHNICAL FIELD

The present invention relates to an electrochromic mirror including a light detection region.

BACKGROUND ART

Electrochromic devices are electrooptical devices configured to electrically change optical characteristics. Such electrooptical devices are used in wide-ranging applications such as shutters, filters, and windows. Such an electrooptical device is known to be used as a vehicle mirror configured to electrically control reflectance (in particular, a rear view mirror), namely, a reflectance-variable mirror.

This reflectance-variable mirror is configured to reduce its reflectance when light emitted from behind the vehicle is reflected by the mirror to inhibit the visual recognition of the driver, to thereby suppress degradation of the visual recognition function of the driver. Such a reflectance-variable mirror is known to include an optical sensor. With this optical sensor, light incident on the sensor is detected; in response to the amount of this light, the absorbance of the reflectance-variable mirror is controlled, so that, upon incidence of light that would inhibit visual recognition, the reflectance can be effectively controlled.

Patent Literature 1 describes an electrochromic mirror for vehicles. The electrochromic mirror includes an electrochromic (hereafter, also referred to as EC), and an optical sensor. The optical sensor is disposed on the rear surface of the EC mirror, or outside of the EC mirror. According to Patent Literature 1, when the optical sensor is disposed on the rear surface of the EC mirror, the optical sensor receives light through an opening formed in the EC mirror.

CITATION LIST

Patent Literature

PTL 1 PCT Japanese Translation Patent Publication No. 2006-526176

The electrochromic mirror described in PTL 1 has a configuration in which the optical sensor receives light through the opening. Thus, in a case where light is incident on a localized region, appropriate control of the reflectance is difficult to perform. Specifically, this case is, for example, a case where light is not incident on the EC mirror, but strong light is incident on only an optical sensor disposed in the bezel member of the EC mirror, or a case where strong light is incident on an optical sensor through the opening of the EC mirror, but the incident region is so small that the light does not considerably inhibit the visual recognition of the driver.

In such cases, the reflectance of the EC mirror may not be appropriately controlled, which results in inhibition of the visual recognition of the driver.

Under such circumstances, the present invention has been made. The present invention provides an EC mirror that includes a light detection region, to thereby appropriately control the transmittance.

SUMMARY OF INVENTION

Accordingly, the present disclosure discloses an electrochromic mirror including a light detection region. An electrochromic mirror according to a first aspect includes a light reflective member and an electrochromic device disposed on a reflective surface side of the light reflective member, wherein the electrochromic mirror includes at least one light detection region, the at least one light detection region includes a plurality of openings defined in the light reflective member, and the electrochromic mirror is configured to control a transmittance of the electrochromic device in response to at least a portion of an amount of light in the at least one light detection region.

An electrochromic mirror according to a second aspect includes a light reflective member; a bezel member; a light transmissive member disposed between the light reflective member and the bezel member; and an electrochromic device disposed on a reflective surface side of the light reflective member, wherein the light transmissive member is at least one light detection region, the electrochromic mirror is configured to control a transmittance of the electrochromic device in response to at least a portion of an amount of light in the at least one light detection region.

Further features of the present invention will become apparent from the following description of exemplary embodiments with reference to the attached drawings.

DESCRIPTION OF EMBODIMENTS

The present disclosure relates to an electrochromic mirror including a light reflective member, an electrochromic device disposed on the reflective surface side of the light reflective member, and a light detection region. The light detection region of the electrochromic mirror includes a light detection unit, and is configured to control the transmittance of the electrochromic device in response to the data detected with the light detection unit.

Most of light incident on the light reflective member can be detected to obtain data used for controlling the electrochromic device. This enables appropriate light modulation of the electrochromic mirror.

In this Specification, light is sometimes divided into different components and referred to as, for example, incident light and ambient light. The incident light means, for example, light incident on the light reflective member, that is, directional light. By contrast, the ambient light is outdoor light, that is, undirectional light.

The bezel can also be referred to as, for example, the framework or frame of the electrochromic mirror. The light reflective member is a member configured to reflect light, and can also be referred to as a mirror member. The light detection unit may be an optical sensor. Light incident on the light detection region passes through the light guide unit to reach the light detection unit. The light guide unit may be, for example, an optical fiber or simply a cavity.

Hereinafter, embodiments according to the present invention will be described in detail with reference to drawings.

First Embodiment

Figure 1A:
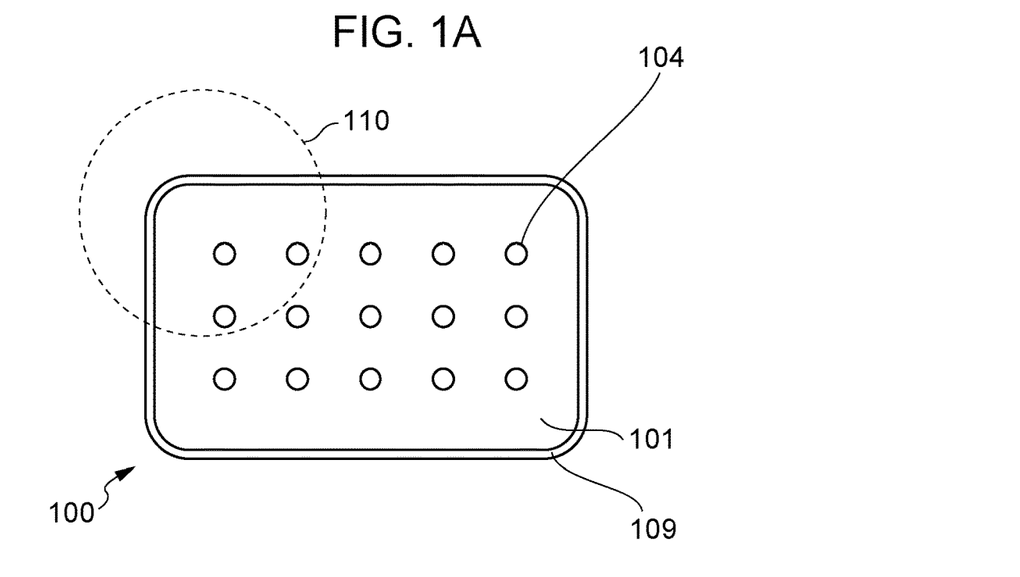
FIG. 1A is a schematic front view of an EC mirror according to a first embodiment.
Figure 1B:
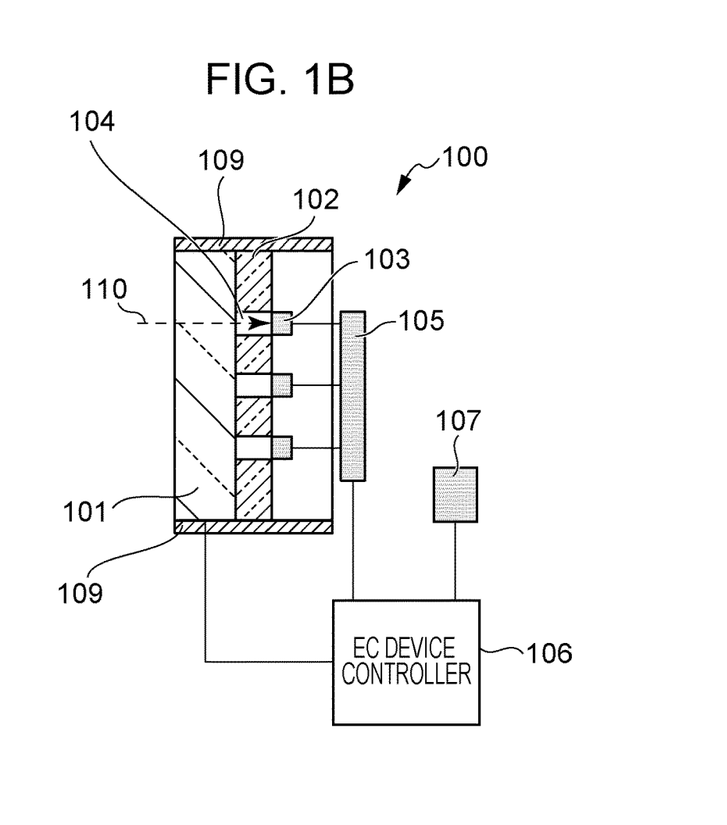
FIG. 1B is a schematic sectional view of the EC mirror according to the first embodiment.

FIGS. 1A and 1B are schematic views of an EC mirror 100 according to a first embodiment of the present invention. FIG. 1A is a schematic front view. FIG. 1B is a schematic sectional view corresponding to FIG. 1A.

Referring to FIGS. 1A and 1B, the EC mirror 100 includes an EC device 101, a mirror member 102, optical sensors 103, and openings 104. The plurality of openings 104 are formed in the surface of the mirror. Light incident on the mirror passes through the openings and enters the optical sensors 103.

The EC mirror 100 also includes a detector 105 configured to determine the intensity of light incident on the optical sensors 103, and a EC device controller 106 configured to operate, with reference to the data of the intensity of light incident on the optical sensors 103, the EC device 101. The detector 105 and the EC device controller 106 may be collectively installed. More specifically, the EC device controller 106 is connected to the detector 105. An ambient light sensor 107 is connected to the EC device controller 106. The EC device controller 106 is connected to the EC device 101. This phrase "connected to the EC device" means direct connection or indirect electrical connection to at least any one of the electrodes of the EC device.

The EC mirror 100 also includes the ambient light sensor 107 configured to determine the intensity of ambient light. With reference to the output from the ambient light sensor, when the light incident on the mirror is the same as the ambient light, the EC mirror may be controlled not to perform light modulation. Specifically, with reference to the output from the ambient light sensor, the transmittance of the EC device can be controlled. The EC mirror 100 may further include a bezel member 109.

When incident light 110 enters a portion of the EC mirror (FIG. 1A), some of the optical sensors receive information of entry of light into the EC mirror, whereas the other optical sensors do not receive the information of entry of light. The EC mirror recognizes this state and appropriately performs light modulation. For example, the surface of the light reflective member may be divided into regions for individual recognition; the plurality of regions may be ranked in order of priority and, accordingly, light modulation may be performed. Specifically, for example, the mirror may carry out control of performing light modulation upon entry of light to a region with a higher priority even though the light enters only a portion of the mirror, or the mirror may carry out control of not performing light modulation upon entry of light to a region with a lower priority.

The divided regions may be provided by, for example, dividing the light reflective member in FIG. 1A into three divisions arranged in the horizontal direction, and dividing each division into two divisions arranged in the vertical direction. In this case of providing divided regions, the lower central (in the horizontal direction) region or the upper central (in the horizontal direction) region may be ranked with a higher priority. Alternatively, non-central (in the horizontal direction) regions may be ranked with a lower priority. The term "priority" means the order of priority of divided regions for individual recognition.

The EC mirror according to the first embodiment has a configuration in which the optical sensor is disposed such that the light reflective member is disposed between the optical sensor and the EC device. Thus, the bezel member needs not to have an optical sensor or a light guide unit communicating with the optical sensor. As a result, the bezel can be designed with a small size.

The EC mirror according to this embodiment may have, for reference, the predetermined data of voltage-current characteristics of the electrochromic device. The phrase "have, for reference" means that the controller of the EC mirror may have the data or may refer to the data via communication. The voltage-current characteristics are the relation between the voltage applied to the EC device and a current passing through the EC device; by referring to this data, an appropriate voltage for providing the target transmittance can be estimated.

Second Embodiment

Figure 2A:
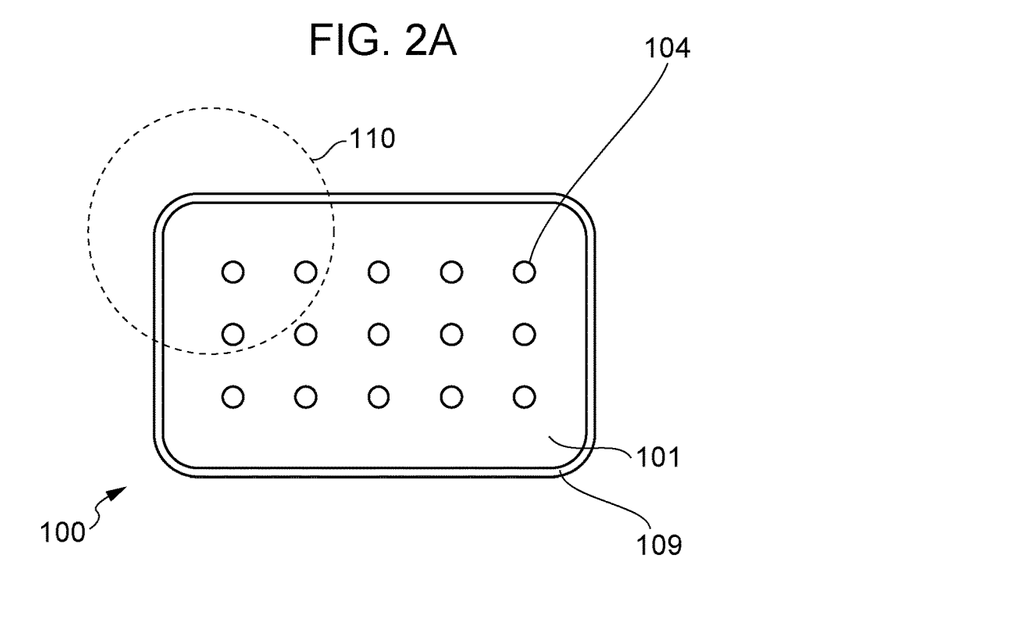
FIG. 2A is a schematic front view of an EC mirror according to a second embodiment.
Figure 2B:
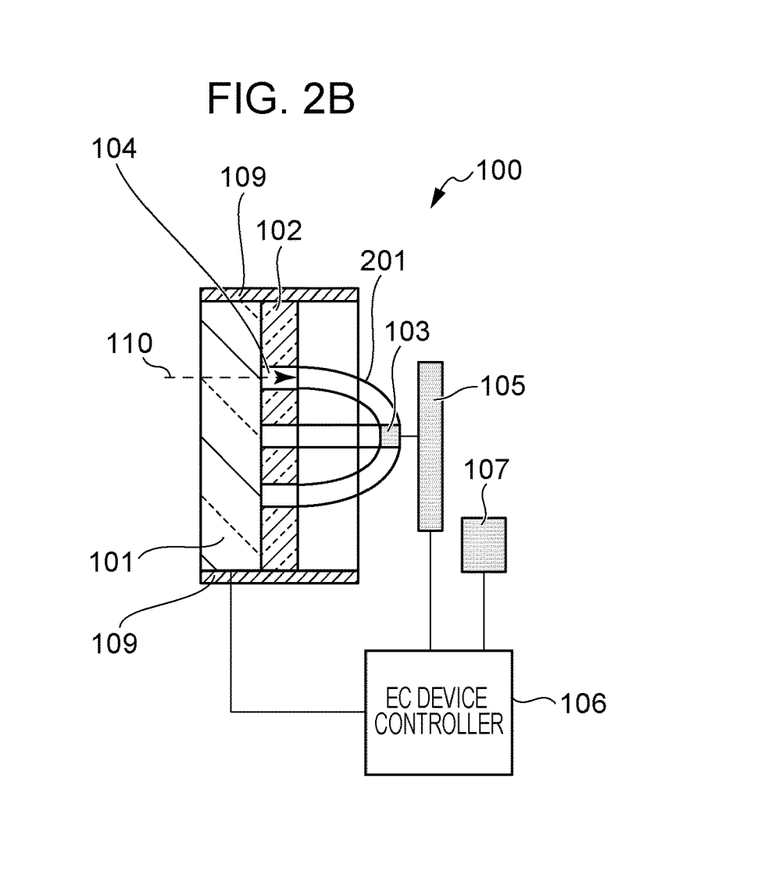
FIG. 2B is a schematic sectional view of the EC mirror according to the second embodiment.

The second embodiment is the same as the first embodiment except that a single optical sensor is connected to a plurality of openings. FIGS. 2A and 2B are schematic views of an EC mirror according to the second embodiment. The optical sensor and plurality of openings are connected via a light guide. The light guide can be a light guide member such as an optical fiber.

The EC mirror according to the second embodiment can be provided as an EC mirror having a less number of optical sensors. The EC mirror according to the second embodiment in which a plurality of openings correspond to a single optical sensor may be designed so as to have a configuration in which the light reflective member is divided into regions for individual recognition, and the regions correspond to optical sensors in a one-to-one relationship.

When optical sensors are individually provided for a plurality of openings, the intensities of light incident on the openings can be individually evaluated. This enables more accurate control of the reflectance of the EC mirror, to thereby further suppress dazzlement of the driver.

In summary, the first and second embodiments provide EC mirrors each including a light detection-light modulation unit configured to perform effective light modulation even in the case of entry of light only to a portion of the EC mirror.

Third Embodiment

Figure 3A:
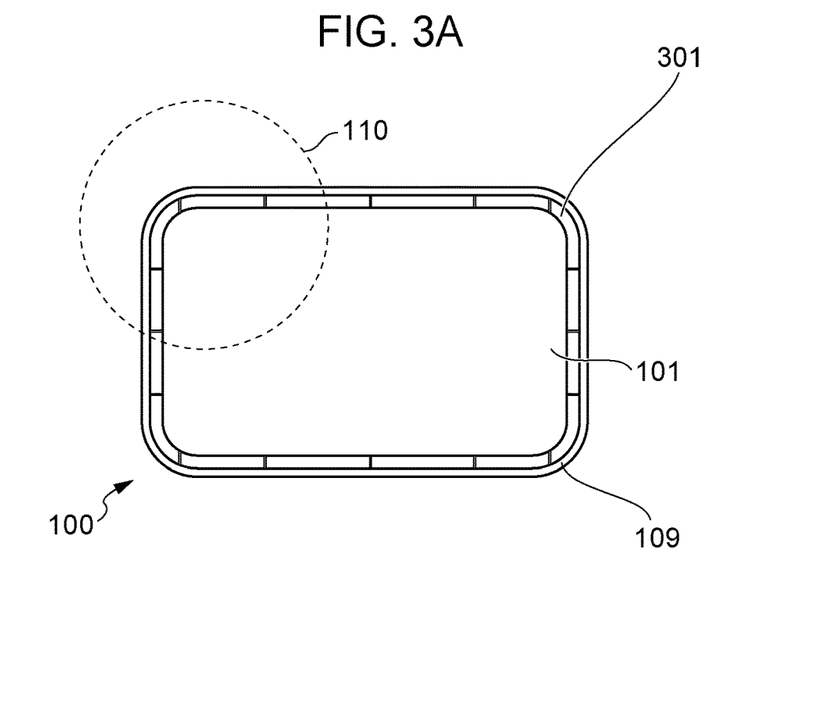
FIG. 3A is a schematic front view of an EC mirror according to a third embodiment.
Figure 3B:
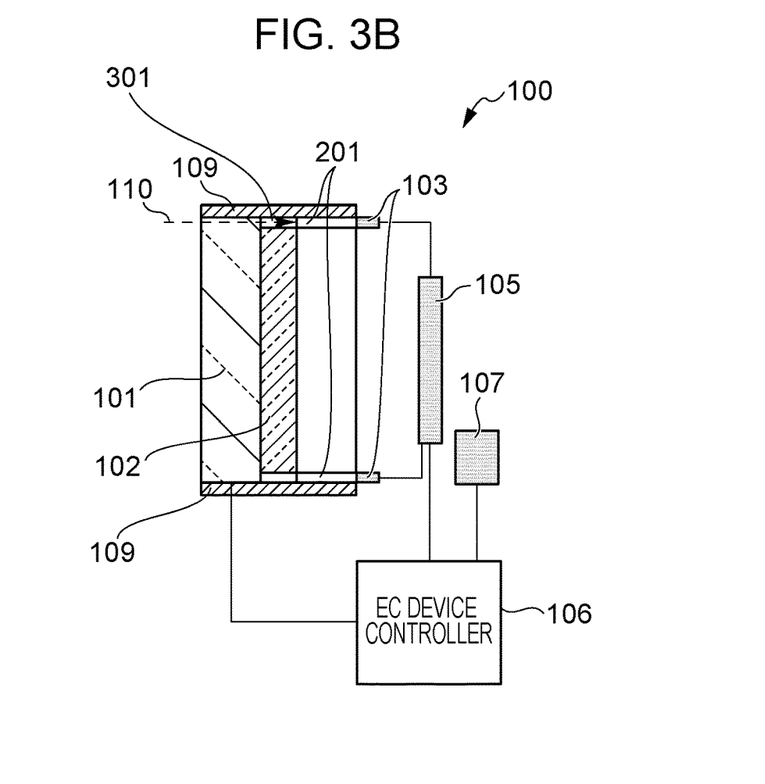
FIG. 3B is a schematic sectional view of the EC mirror according to the third embodiment.

The third embodiment has a configuration in which a light detection region is disposed between a light reflective member and a bezel member. FIGS. 3A and 3B are schematic views of an EC mirror according to the third embodiment. Referring to the schematic front view of FIG. 3A, incident light 110 passes through an EC device 101 to enter a light transmissive member 301 disposed between the light reflective member and the bezel member. Since the light transmissive member 301 transmits light, light reaches the optical sensor. A light transmissive member may be disposed between the light reflective member and the bezel member. A light guide 201 is disposed between the optical sensor and the light transmissive member. This light transmissive member 301 can be divided into a plurality of divisions. FIG. 3A illustrates a configuration of 16 divisions. In this case, when the optical sensors 103 are disposed so as to respectively correspond to the plurality of divisions of the light transmissive member 301 in FIG. 3A, the region that the incident light 110 has entered in the EC mirror 100 can be determined and the density of the EC device 101 can be controlled.

FIG. 3B is a schematic sectional view. Referring to FIG. 3B, the EC mirror may include, for example, an optical sensor 103 configured to receive light having passed through the light transmissive member, a detector 105, a controller 106, and an ambient light sensor 107. These other members in the third embodiment are the same as in the first embodiment, and the members are connected together as in the first embodiment.

The EC mirror according to the third embodiment needs not to have openings in the light reflective member. As a result, the light reflective member can be provided with a high reflectance, and the mirror can be provided with a good appearance.

The light detection region according to this embodiment may be disposed so as to surround the outer periphery of the light reflective region. A plurality of light detection regions may be disposed around the outer periphery of the light reflective region. The term "outer periphery" is a region outside of the light reflective region and between the light reflective region and the bezel member.

OTHER EMBODIMENTS

An EC mirror according to an embodiment may be configured to individually recognize divided light detection regions. The divided light detection regions may be individually ranked with priorities. For example, the central portion of the mirror may be ranked with a higher priority than the surrounding portions.

When the EC mirror is used with being hung in the gravitational direction, regions of the EC mirror may be provided with different priorities in the vertical direction. Specifically, the lower region may be ranked with a higher priority.

The EC mirror may include a ranking unit configured to rank regions with higher priorities. Examples of the ranking unit include publicly known position ranking units such as, in the EC mirror, a capacitance electrode, an infrared sensor, or a resistive-film electrode.

Alternatively, the EC mirror may be configured to receive output from an external position ranking unit, such as a ranking unit connected to the EC mirror via a cable or wirelessly. Examples of the ranking unit include a car-mounted device and a mobile terminal.

Regarding Constituent Elements

The EC device is a device configured to electrically change its color. The EC device used for an EC mirror is a device combined with a light reflective member and configured to electrically control the reflectance of the mirror.

The EC device includes a pair of electrodes and an EC layer disposed between the electrodes. Such EC devices include EC devices formed of inorganic materials and EC devices formed of organic materials. EC devices formed of organic materials include EC devices formed of high-molecular-weight organic materials and EC devices formed of low-molecular-weight organic materials. The EC device according to the present disclosure may be an EC device formed of high-molecular-weight organic materials or an EC device formed of low-molecular-weight organic materials. However, from the viewpoint of contrast and maximum transmittance, the EC device can be formed of low-molecular-weight organic materials.

The EC layer includes an electrochromic (EC) material, an EC compound. Specific examples of the inorganic EC compounds include tungsten oxide and iridium oxide. Specific examples of the high-molecular-weight organic EC compounds include polythiophene and polyaniline. Specific examples of the low-molecular-weight organic EC compounds include derivatives of pyridine salts, aromatic amine compounds, and derivatives of heterocyclic compounds. Such compounds may be used in the form of being dissolved in solvents. Such materials may be used alone or in combination of two or more thereof. In particular, a derivative of a pyridine salt and a heterocyclic compound can be combined. In particular, a viologen compound and a phenazine compound can be combined.

The solvents in which the EC materials are dissolved are selected in accordance with applications in consideration of, for example, the solubility, vapor pressure, viscosity, and potential window of solutes including EC materials. The solvents can be polar solvents.

Specific examples of the solvents include organic polar solvents such as methanol, ethanol, propylene carbonate, ethylene carbonate, dimethyl sulfoxide, dimethoxyethane, γ-butyrolactone, γ-valerolactone, sulfolane, dimethylformamide, dimethoxyethane, tetrahydrofuran, acetonitrile, propionitrile, benzonitrile, dimethylacetamide, methylpyrrolidinone, and dioxolane, and water. An EC layer 403 may optionally include an electrolyte, a viscosity modifier, and an UV stabilizer, for example.

The range to which the reflectance of the EC mirror is controlled is not particularly limited. However, both of the maximum reflectance (when the EC device is not colored) and the minimum reflectance (when the EC device has the highest transmittance) are desirably within a reflectance range so that the EC mirror functions as an antiglare mirror. Specifically, the reflectance range is ideally 100% to 0.01%, realistically 90% to 0.1%. Between such maximum and minimum values, the reflectance may be controlled in an ON/OFF manner alone, or can be controlled in a stepwise manner for a plurality of stages or in a stepless manner.

Figure 4:
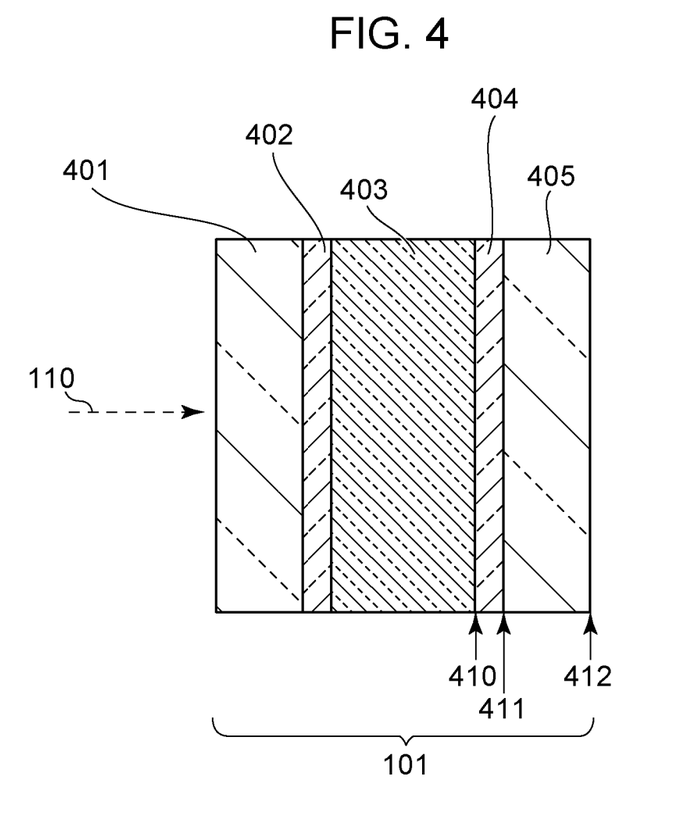
FIG. 4 is a schematic view illustrating an example of the positional relation between an EC device and a light reflective member in an EC mirror.

FIG. 4 is a schematic view illustrating, in the EC device, the arrangement of constituent members including the light reflective member. This drawing will be described such that the orientation on which the incident light 110 is incident is defined as front. The constituent members of the EC device 101 are often arranged from the front to the back in the following order. On the back surface of a front substrate 401, a transparent conductive electrode (may also be referred to as a front electrode 402) is formed, which is followed by an EC layer 403, a back electrode 404, and a back substrate 405. The front substrate 401 is a light transmissive substrate. The term "light transmissive" means that light transmissive members such as substrates and electrodes transmit light and have transmittances of 50% or more and 100% or less. Specifically, such light transmissive members may be formed of, for example, glass or polymer, and optionally coated with, for example, an antireflection coating.

The material for forming the transparent conductive electrode (front electrode 402), which is formed on the back surface of the front substrate 401, can be a material having transparency and conductivity and having stability for the reaction of the EC material. For example, the electrode may be formed of a transparent conductive oxide such as indium tin oxide (ITO) and fluorine-doped tin oxide. The electrode may be equipped with metal wires or a thin film to have a lower resistance. Alternatively, the electrode may be formed of another conductive substance such as CNT.

In order to hold this EC layer 403 between the front electrode 402 and the back electrode 404, or in order to keep the distance between the electrodes, a sealing member (not shown) can be used. This sealing member can be formed of a material that is chemically stable, is less permeable to gas and liquid, and does not inhibit the oxidation-reduction reaction of the EC material. Examples of the material include inorganic materials such as glass frit, organic materials such as epoxy resins and acrylic resins, and metals. The sealing member may be formed, for example, so as to contain a spacer material to have a function of keeping the distance between the front electrode 402 and the back electrode 404.

When the sealing member does not have the function of defining the distance between the front electrode 402 and the back electrode 404, a spacer may be additionally disposed to keep the distance between the electrodes. Examples of the material for the spacer include inorganic materials such as silica beads and glass fiber and organic materials such as polyimide, polytetrafluoroethylene, polydivinylbenzene, fluororubber, and epoxy resin. This spacer can define and keep the distance between the front electrode 402 and the back electrode 404, which constitute the EC device.

The back electrode 404 may be similar to the transparent conductive electrode (front electrode 402) formed on the back surface of the front substrate 401. Alternatively, unlike the front electrode 402 being a light transmissive electrode, the back electrode 404 may be a light reflective electrode. Specifically, the back electrode 404 may be formed of metal, in particular, electrochemically stable noble metal. The back substrate 405 behind the back electrode 404 may be similar to the front transparent substrate. Alternatively, unlike the front substrate 401 being a light transmissive electrode, the back substrate 405 may be light untransmissive electrode. Specifically, the back substrate 405 may be formed of metal.

In the EC mirror according to this embodiment, the light reflective member may be disposed at any position behind the EC layer 403 and on the optical path without particular limitations. Specific examples of the position are as follows.

Referring to FIG. 4, the light reflective member may be disposed at a position 410, 411, or 412. Such light reflective members may be respectively provided at these positions by, for example, using a reflective material to form the back electrode 404, using a reflective material to form the back substrate 405, and disposing a reflective member behind the back substrate 405.

The method of forming the light reflective member is not particularly limited as long as the resultant EC mirror has sufficient reflection characteristics. Examples of the method include sputtering, vapor deposition, and plating using metal.

The light reflective member according to this embodiment may include a plurality of openings. These openings enable incident light entering the surface of the EC device to pass through a portion of the light reflective member to reach an optical sensor. Since the plurality of openings are formed, even in the case of localized incidence of light, light modulation can be appropriately performed. The number of openings may be any number as long as the openings do not degrade the function of the mirror. The number of openings is preferably 3 or more, more preferably 5 or more. The number of openings is more preferably 100 or less because the openings do not degrade the appearance of the mirror. The openings can have small sizes as long as a sufficient amount of incident light is obtained.

In order to detect incident light over a wider area of the EC mirror, the EC mirror may include a plurality of openings. These plurality of openings can be widely distributed over the area of the EC mirror. Specifically, a figure defined by line segments connecting the plurality of openings can have a maximum area accounting for 50% or more of the total area of the light reflective member. In this case, three or more openings are formed, and, of these, three openings are freely selected to form the figure. In another case, three or more openings are formed, and, of these, all of openings are connected each other by a line to form the figure. Among such figures defined by line segments, a figure having the maximum area may be selected.

In this case, incident light can be detected over a wider area of the EC mirror, and accordingly the reflectance of the EC mirror can be controlled. The light transmittance of the openings is not particularly limited as long as intended responses are obtained in accordance with the intensity of incident light, the density of the EC device, and the optical sensor.

The light transmittance may be, for example, in a range of 1% to 100%. When the light transmittance is high, the response of the optical sensor to incident light can be obtained as strong signals, or a reduction in the areas of the openings can be achieved while the intensity of incident light detected is unchanged.

On the other hand, a lower light transmittance (and a higher reflectance of the mirror) makes the openings less noticeable, resulting in a better appearance of the mirror. A mirror including a light reflective member in which the size, number, and reflectance of the openings are appropriately selected has a better appearance than mirrors having excessively large number of openings.

The specific sizes of the plurality of openings may be determined in accordance with the transmittance of the openings as described above, and may be 1 µm or more and 5 mm or less, preferably 10 µm or more and 1 mm or less. The openings can be arranged in an array. Among these openings arranged in an array, the number of openings arranged in the horizontal direction can be larger than the number of openings arranged in the vertical direction. This is because humans have a field of vision wider in the horizontal direction, and mirrors often have a shape wider in the horizontal direction.

The method of forming the openings can be any method as long as the resultant openings have the predetermined light transmissive characteristics. Examples of the method include a method of masking some regions during formation of the light reflective member, and a method of removing portions of the formed light reflective member.

The former method may be, for example, a method of forming a mask corresponding to the pattern of openings on the surface on which the light reflective member is to be formed by sputtering, and removing the mask after formation of the reflective member by sputtering.

The latter method may be, for example, a method of, after formation of the light reflective member, applying photoresist onto the light reflective member, exposing and developing the photoresist to form the mask pattern of openings, and then removing portions of the light reflective member by, for example, etching, and a method of forming the pattern of openings by laser etching.

The optical sensor is selected in accordance with the wavelength and intensity of light expected as incident light. Examples of the optical sensor include photodiodes, phototransistors, photoresistors, CCD, and CMOS.

Referring to FIG. 1B, such optical sensors 103 may be disposed so as to respectively correspond to the plurality of openings 104. In this case, the amount of incident light over a wide area of the EC mirror 100 and the amount of incident light on a narrow area of the EC mirror 100 can be both detected, and accordingly the density of the EC device 101 can be controlled. Specifically, even when a plurality of openings 104 are formed, in the case of providing a single optical sensor alone, weak light incident on the whole surface of the EC mirror 100 is difficult to be distinguished from strong light incident on a portion of the surface of the EC mirror 100. By contrast, when the optical sensors 103 are respectively disposed so as to correspond to the plurality of openings 104, the broad weak light is distinguishable from the localized strong light, and the EC mirror 100 can be controlled to appropriate reflectances.

Figure 9A:
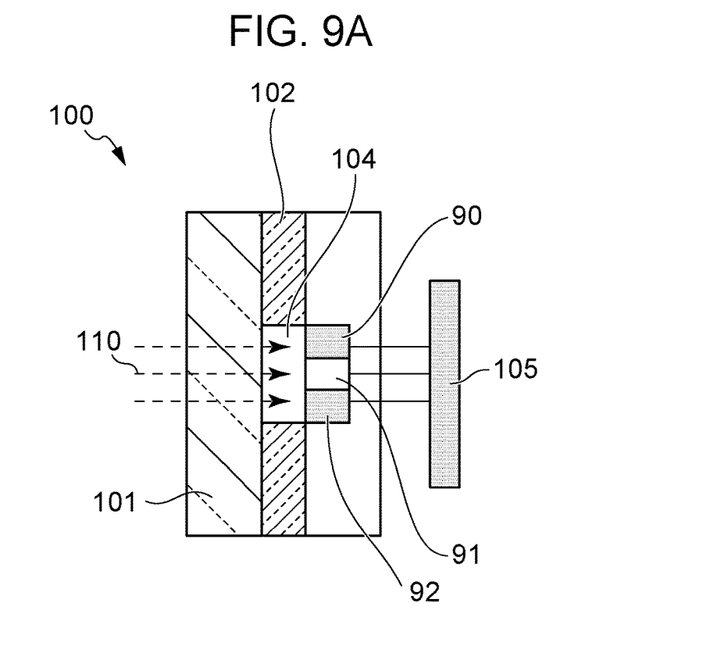
FIG. 9A is a schematic view of an EC mirror according to an embodiment.
Figure 9B:
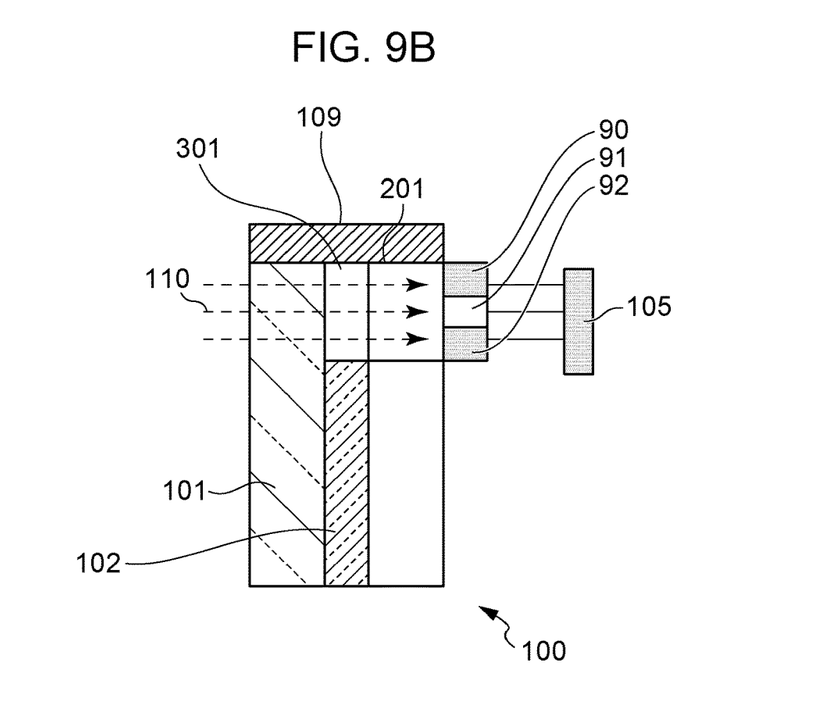
FIG. 9B is a schematic view of an EC mirror according to an embodiment.

A plurality of optical sensors may be disposed so as to correspond to one of openings 104 or one of light transmissive members 301. FIG. 9A illustrates an example in which three optical sensors 90, 91, and 92 are disposed so as to correspond to one of a plurality of openings 104 (a magnified section of a portion of the EC mirror). FIG. 9B illustrates an example in which three optical sensors 90, 91, and 92 are disposed so as to correspond to one of light transmissive members 301 (a magnified section of a portion of the EC mirror). When a plurality of optical sensors are disposed so as to correspond to one of openings 104 or one of light transmissive members 301, detailed data on incident light can be obtained. Specific examples include detection of wavelengths of incident light, and use of different sensors in response to the intensity of light. Specific examples of the former include the following: whether incident light is visible light or invisible light such as IR light is determined, and accordingly the light modulation state of the EC device is controlled; and incident light is separately detected as RGB to presumably identify the light source, and the EC device is controlled in accordance with the light source. Examples of the latter include the following: low-intensity light sensors and high-intensity light sensors are disposed and selectively used in accordance with the intensity of incident light, to thereby expand the detectable range of the intensity of light.

A plurality of optical sensors can be disposed so as to correspond to each of amount-of-light variable regions of the EC mirror 100. In the EC device, its electrodes can be electrically divided to provide divided regions for modulating the amount of light. These divided regions are herein referred to as amount-of-light variable regions. The EC mirror 100 may include a plurality of amount-of-light modulation regions; in this case, a plurality of optical sensors can be disposed so as to correspond to each of the amount-of-light modulation regions. In this case, even when incident light is non-uniformly applied to one of the amount-of-light modulation regions, amount-of-light modulation can be more appropriately performed than in a case where a single optical sensor is disposed so as to correspond to each of the amount-of-light modulation regions. The EC mirror 100 can have a configuration in which it has a single amount-of-light modulation region, and a plurality of optical sensors are disposed so as to correspond to the single amount-of-light variable region. This configuration is advantageous in terms of production processes and costs. In addition, discontinuous density changes between amount-of-light variable regions due to formation of the plurality of amount-of-light variable regions are avoided, so that the resultant appearance has higher quality.

The detector 105, which is configured to detect the intensity of incident light on the optical sensor 103, is used in combination with the optical sensor 103, and plays the role of detecting the intensity data of light converted into voltage or current. This detector can be selected in accordance with the characteristics of the optical sensor. The EC device controller 106 is configured to control the density of the EC device 101 in accordance with the light intensity data obtained from the optical sensor 103 and the detector 105. Specifically, when the incident light hinders visual recognition of the driver, the EC device controller 106 increases the transmittance of the EC device 101, to thereby reduce the effect of the incident light 110. This EC device controller 106 and the detector 105 may be collectively installed.

The method of controlling the transmittance of the EC device may be any method as long as it provides the function of the EC mirror. Specific examples of the method are as follows.

Examples of the method of controlling the EC device include control of voltage, control of current, and control of the duty ratio of pulse-width modulation driving. In particular, control of the duty ratio of pulse-width modulation driving, control of voltage, or the combination of these can be used. Depending on the combination of such a control method and an EC device employed, the relation between the transmittance of the EC device and control parameters may be measured in advance and stored as data. The data is, for example, a table of patterns of applying voltage and current for driving the EC device. While the EC device controller controls the transmittance of the EC device, it refers to the table of patterns of applying voltage and current, to control the EC device to a desired transmittance.

The EC mirror according to this embodiment may further include an ambient light sensor configured to detect the intensity of ambient light. The transmittance of the EC device can be controlled in accordance with the balance between the incident light on the mirror and the ambient light. Specifically, in a case where the ambient light has high intensity (for example, in the daytime), even in spite of high intensity of incident light, the incident light less adversely affects the visual recognition of the driver than in a case where the ambient light has low intensity (for example, at night); thus, the density of the EC device can be controlled to a relatively low value.

Hereinafter, a light-detection and density-control step of the EC mirror will be described with reference to the flowchart in FIG. 5.

Figure 5:
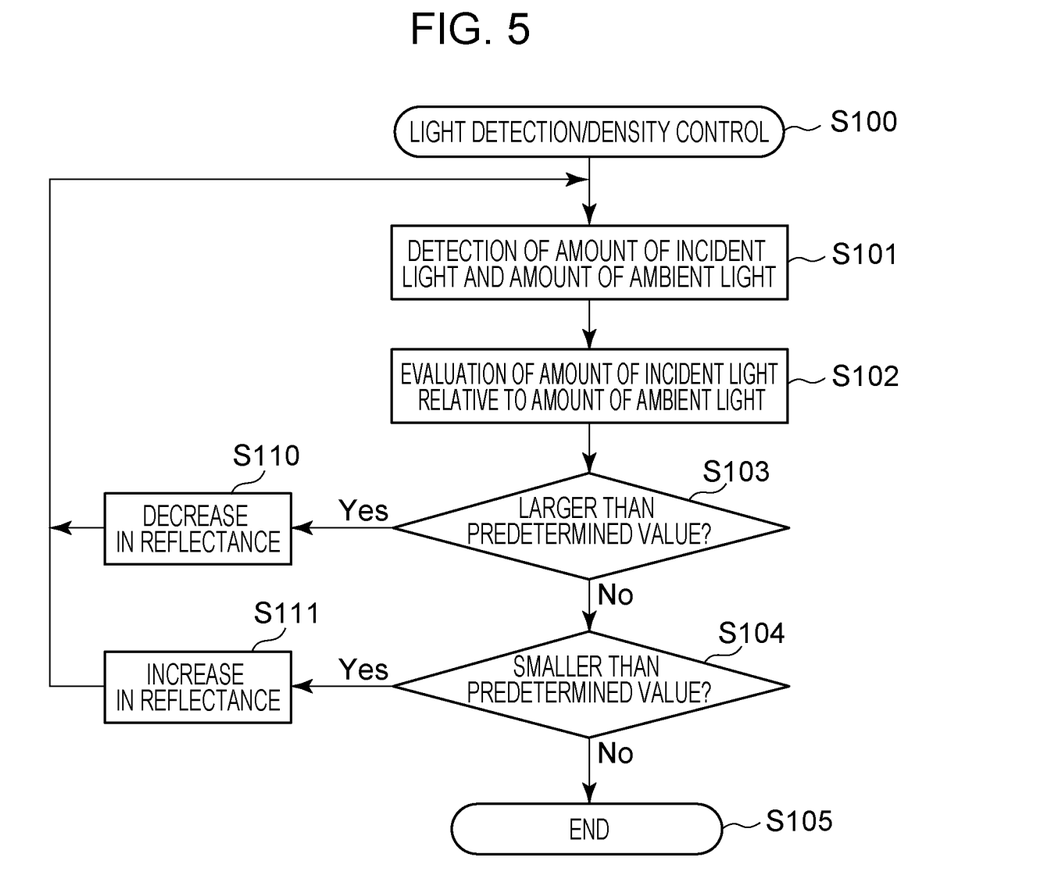
FIG. 5 is a flowchart illustrating the step of light detection and density control in an EC mirror.

FIG. 5 is a flowchart illustrating the whole process of the light-detection and density-control step of the EC mirror.

The process starts at Step (hereafter, S) 100. In S101, the optical sensor 103, the ambient light sensor 107, and the detector 105 are used to detect the amount of incident light and the amount of ambient light. The process proceeds to S102.

In S102, the EC device controller is used to evaluate the amount of incident light relative to the amount of ambient light. The process proceeds to S103. The resultant evaluated value of the amount of incident light relative to the amount of ambient light may be determined in consideration of the number, sensitivity, and arrangement of the openings, light transmissive members, optical sensors, and ambient light sensors. In order to perform control in consideration of the difference between ambient light and incident light, this difference is evaluated in S102. Examples of the influence of the intensity of ambient light and the intensity of incident light on visual recognition and the corresponding control on the reflectance of an EC mirror are summarized in Table 1.

TABLE 1

Examples of evaluated value of amount of incident light relative to amount of ambient light

| No. | Intensity of ambient light | Intensity of incident light | Influence on visual recognition | Appropriate reflectance of EC mirror 100 |
|---|---|---|---|---|
| 1 | High | High | Small to medium | High to medium |
| 2 | High | Low | Small | High |
| 3 | Low | High | Large | Low |
| 4 | Low | Low | Small to medium | High to medium |

Alternatively, when a plurality of optical sensors are disposed so as to correspond to each of a plurality of openings, the evaluation can be performed in the following manner. The evaluated values in this case of using a plurality of optical sensors can also be determined in consideration of the number, sensitivity, and arrangement of openings, light transmissive members, and optical sensors.

When the data of the intensities of incident light detected with the plurality of optical sensors is used, the value of the amount of incident light on the whole surface of the EC mirror can be accurately estimated and calculated, compared with the case of using the data obtained from a single optical sensor. Even though incident light does not have a very high average intensity over the whole region of the mirror, when the incident light has a high maximum intensity, the light dazzles the driver. In such a case, the appropriate reflectance of the EC mirror is low. Examples of control in such cases are summarized in Table 2.

TABLE 2

Examples of control in case of using plurality of photosensors

| No. | Accumulated intensity of incident light detected with plurality of photosensors | Maximum intensity of light detected with plurality of photosensors | Influence on visual recognition | Appropriate reflectance of EC mirror |
|---|---|---|---|---|
| 5 | High | High | Large | Low |
| 6 | Low | High | Medium to large | Medium to low |
| 7 | Low | Low | Small | High |

In S103, whether or not the evaluated value of the amount of incident light relative to the amount of ambient light is larger than the predetermined value is determined with the EC device controller. When the answer is Yes, the process proceeds to S110. When the answer is No, the process proceeds to S104.

In S110, the EC device controller increases the transmittance of the EC device, to cause a decrease in the reflectance of the EC mirror. The process returns to S101.

In S104, whether or not the evaluated value of the amount of incident light relative to the amount of ambient light is smaller than the predetermined value is determined with the EC device controller. When the answer is Yes, the process proceeds to S111. When the answer is No, the process proceeds to S105, where the "light-detection and density-control of EC mirror" step ends.

In S111, the EC device controller decreases the transmittance of the EC device, to cause an increase in the reflectance of the EC mirror. The process returns to S101.

The controls having been described so far are mere examples. Alternatively, the EC mirror may be controlled in a publicly known manner.

EXAMPLES

Hereinafter, the present invention will be more specifically described with reference to Examples. However, the present invention is not limited to these Examples.

Figure 6:
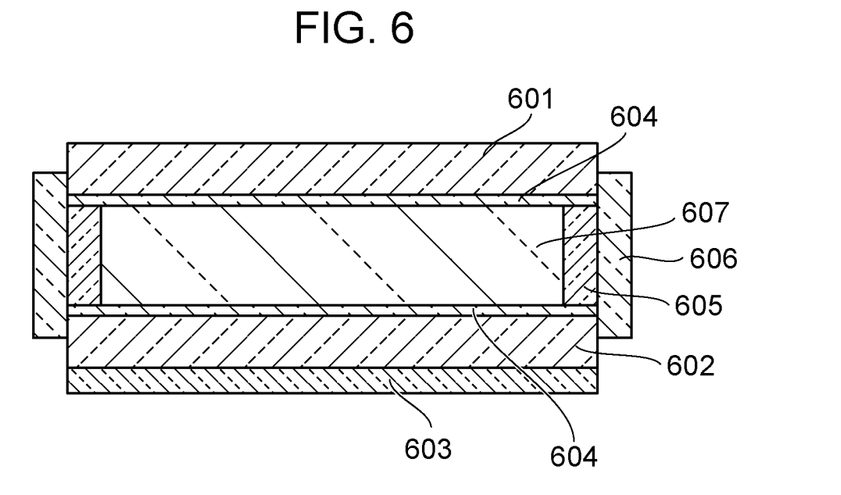
FIG. 6 is a schematic sectional view of EC mirrors in Examples and Comparative Examples.

The EC mirror illustrated in FIG. 6 was produced by the following steps.

(1) Production of EC Mirror Body

As the front substrate, a transparent conductive glass (601) having an indium tin oxide (ITO) film thereon was prepared. In addition, a conductive glass was prepared by sputtering the back surface of another ITO substrate (602) with titanium and silver to form a light reflective member (603). A sealing member 605 was formed by applying an UV-curable adhesive containing 100 μm spacer beads to the outer periphery of the substrate. Subsequently, the two conductive glasses were placed on top of each other such that the ITO films 604 faced each other, and irradiated with UV light, to cure the adhesive. Thus, the substrates were bonded together.

Figure 7A:
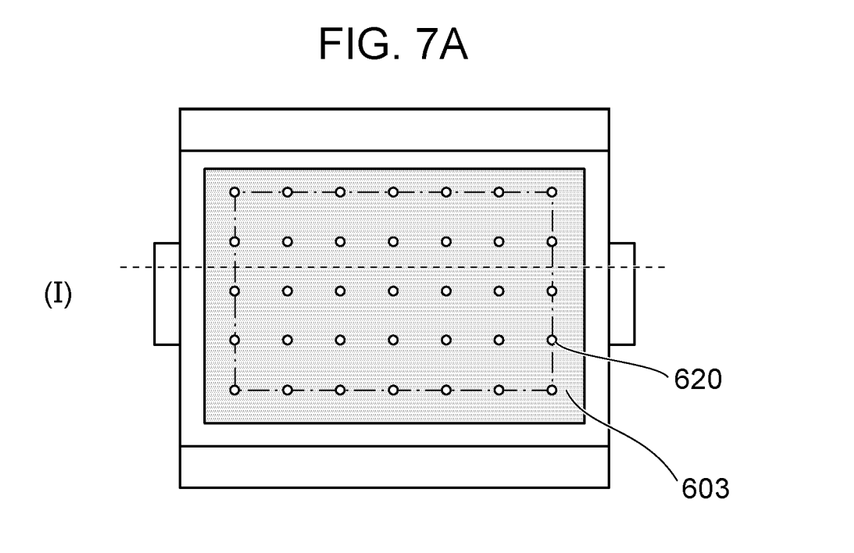
FIGS. 7A and 7B are schematic front views of EC mirrors of Examples.
Figure 7B:
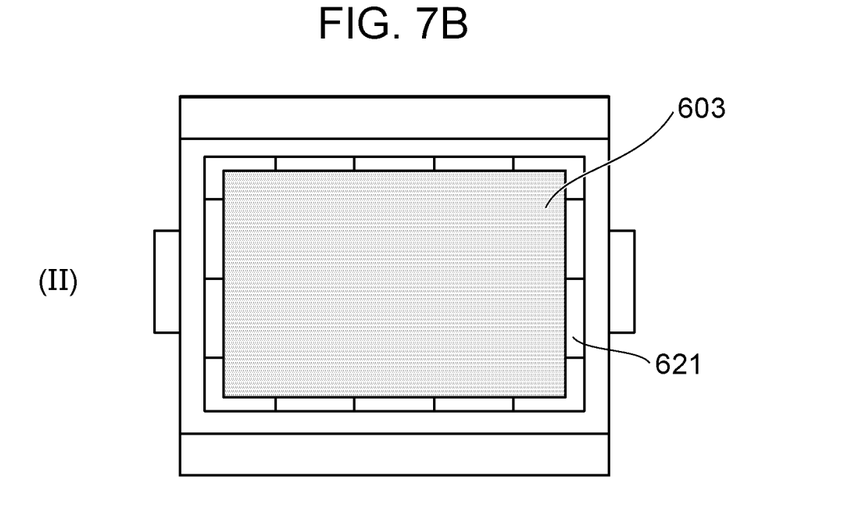

For the light reflective member, a mask for sputtering was used to form the following pattern (I) or (II):

(I) 5×7 openings (620) arranged in an array and having a diameter of 0.5 mm, or (II) a light transmissive member (621) divided into 14 portions and surrounding the reflective region.

FIGS. 7A and 7B are schematic front views of (I) and (II) above. In the case of (I), the figure defined with line segments connecting the openings (620) has a maximum area (the area of a figure defined by the single-dot-dashed line in FIG. 7A) accounting for 65% of the total area of the light reflective member.

(2) Injection of Electrolytic Solution

An anodic EC compound that was 5,10-dimethyl-5,10-dihydrophenazine and a cathodic EC compound that was heptyl viologen trifluoromethanesulfonic acid salt were dissolved in propylene carbonate to prepare an electrolytic solution. At this time, the EC compounds contained in the electrolytic solution each had a concentration of 50 mM. Subsequently, this electrolytic solution was injected, through an injection port (not shown) formed in the sealing member 605, into a cavity 607 to provide an EC layer. The injection port was closed with sealing 606 formed from the above-described UV-curable adhesive. Thus, an EC device was obtained.

Incidentally, 5,10-dimethyl-5,10-dihydrophenazine may be abbreviated as DMDHP; and heptyl viologen trifluoromethanesulfonic acid salt may be abbreviated as HV.

(3) Installation of Optical Sensor, Detector, EC Device Controller, and Ambient Light Sensor On the back surface of the EC mirror, as the optical sensor, a photodiode was installed. When such optical sensors were installed so as to correspond to openings or light transmissive members, they were directly fixed, with an adhesive, to the openings or the light transmissive members. When light is concentrated from a plurality of openings to an optical sensor, a light guide material was used to concentrate light to the optical sensor. As the detector, a voltmeter for measuring the voltage of the photodiode was installed and connected to a personal computer (PC). A potentiostat controlled with a PC was connected as the EC device controller to the EC device. On the back surface of the EC mirror, another photodiode and another voltmeter were installed as the ambient light sensor and connected to a PC. The relations between incident light on the optical sensor and voltage signals and between incident light on the ambient light sensor and voltage signals were measured to form a light intensity table. In addition, the relation between the voltage applied with the potentiostat and the density of the EC device was measured to form a transmittance table of the EC device.

(4) Description of Example Samples and Comparative Example Samples

An EC mirror in which optical sensors were individually disposed so as to correspond to 5×7 arrayed openings was defined as Example 1. Another EC mirror in which light was guided through 5×7 arrayed openings and concentrated to a single optical sensor was defined as Example 2. Another EC mirror in which optical sensors were individually disposed so as to correspond to 14 divided portions of a light transmissive member was defined as Example 3. In each of Examples 1 and 3, a plurality of optical sensors were disposed, and the data of distribution of the intensity of incident light over the surface of the EC mirror was used to control the reflectance of the EC mirror. On the other hand, two Comparative Examples were provided.

Figure 8A:
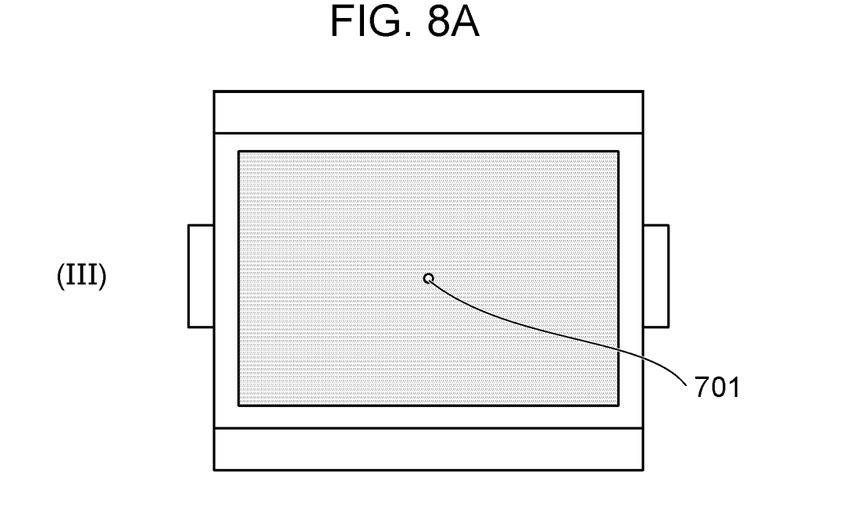
FIGS. 8A and 8B are schematic front views of EC mirrors of Comparative Examples.
Figure 8B:
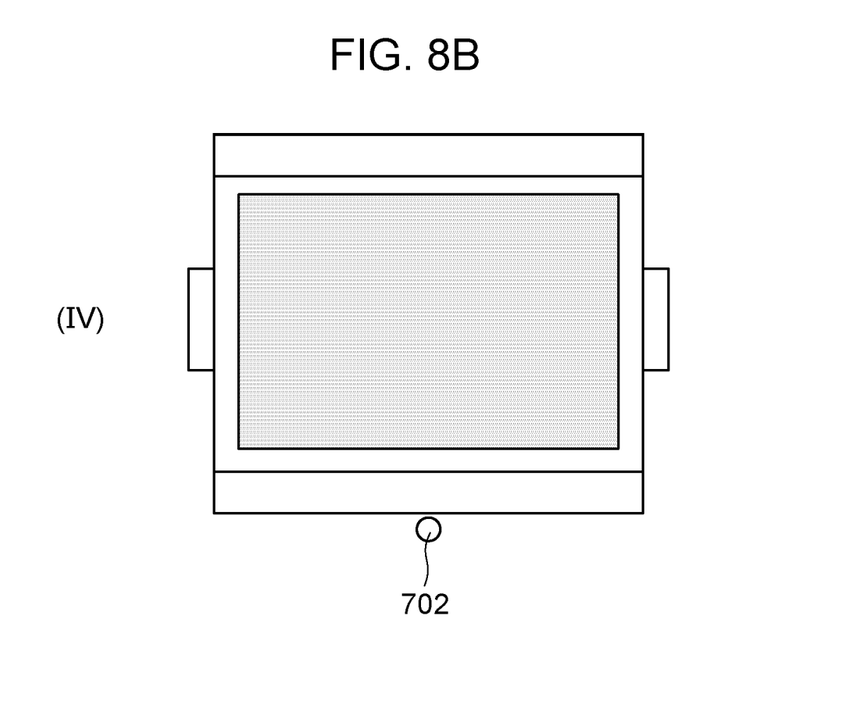

The EC mirrors of Comparative Examples are illustrated in FIGS. 8A and 8B. An EC mirror in which an opening 701 is formed at a single central position, and an optical sensor was disposed on the back surface was defined as Comparative Example 1 and referred to as (III). Another EC mirror in which an optical sensor was disposed outside of the light reflective member was defined as Comparative Example 2 and referred to as (IV). Table 3 summarizes Example samples and Comparative Example samples. In all Examples and Comparative Examples, control parameters were adjusted with reference to the above-described light intensity table and the transmittance table such that, even during varied intensities of ambient light, light emitted behind from the headlight of an automobile to the optical sensor did not dazzle the subject (driver).

TABLE 3

Summary of Example samples and Comparative Example samples

|  | Example 1 | Example 2 | Example 3 | Comparative Example 1 | Comparative Example 2 |
|---|---|---|---|---|---|
| Positions of light transmission | (I) Openings (5 × 7) | (I) Openings (5 × 7) | (II) Light transmissive member (14 divided portions) | (III) Opening (1) | (IV) Outside |
| Number of photo-sensors | 35 (5 × 7) | 1 | 14 | 1 | 1 |
| Data of distribution of incident light | Used | Not used | Used | Not used | Not used |

(5) Evaluations

Under different irradiation conditions for EC mirrors, the degree of dazzlement of the subject (driver) was determined by sensory evaluation. The mirrors were disposed in the dark, where vehicle reflectance-variable mirrors most effectively provide the reflectance-variable function.

Evaluation 1 was performed in which the whole surface of each EC mirror was irradiated with light from the headlight of an automobile, and the outside of the mirror was not irradiated. In this case, in EC mirrors of all Examples and Comparative Example 1, the reflectance of each EC mirror was decreased and the degree of dazzlement was low. By contrast, in Comparative Example 2, light entered the EC mirror but did not enter the optical sensor, so that the reflectance of the EC mirror was not decreased.

Evaluation 2 was performed in which the whole region of each EC mirror except for a single opening or a single transmissive member was irradiated with light from the headlight of an automobile. In this case, in the EC mirrors of all Examples, the reflectance of each EC mirror was decreased. By contrast, in Comparative Example 1, light entered the EC mirror, but did not enter the optical sensor, so that the reflectance of the EC mirror was not decreased.

Evaluation 3 was performed in which a half of the plurality of openings or a half of the transmissive member of each EC mirror was irradiated with light from the headlight of an automobile. In this case, in the EC mirrors of Examples 1 and 3, the reflectance of each EC mirror was sufficiently decreased. By contrast, in the EC mirror of Example 2, when light at a half intensity entered the whole surface of the EC mirror, the EC mirror was controlled to an appropriate reflectance; however, the control was inferior to the control in Examples 1 and 3.

Table 4 summarizes the results of Evaluations 1 to 3.

TABLE 4

Summary of results of Evaluations 1 to 3 (degree of dazzlement of subject)

| Degree of dazzlement | Example 1 | Example 2 | Example 3 | Comparative Example 1 | Comparative Example 2 |
|---|---|---|---|---|---|
| Evaluation 1 | Low | Low | Low | Low | High |
| Evaluation 2 | Low | Low | Low | High | — |
| Evaluation 3 | Low | Medium | Low | — | — |

The results have demonstrated the following.

From Evaluation 1

When incident light is detected with optical sensors through openings or a light transmissive member, and the control of transmittance is performed with reference to the evaluation of the amount of incident light to the amount of ambient light, the reflectance of the EC mirror is appropriately controlled, and dazzlement of the subject is mitigated, compared with the existing EC mirrors.

In addition, Examples 1 to 3 according to the present invention have demonstrated the following.

From Evaluation 2

When an EC mirror includes a plurality of openings or a light transmissive member surrounding a light reflective member, and even when light enters only a portion of the plurality of openings or the light transmissive member, the reflectance of the EC mirror is effectively controlled, and dazzlement of the subject is mitigated.

Furthermore, Examples 1 and 3 have demonstrated the following.

From Evaluation 3

When an EC mirror includes optical sensors individually disposed so as to correspond to a plurality of openings or divided portions of a light transmissive member, the intensities of light entering the openings or the divided portions of the light transmissive member can be individually evaluated. Thus, the reflectance of the EC mirror can be controlled at higher accuracy, so that dazzlement of the subject is further mitigated.

The present invention provides an EC mirror that includes a light detection region to thereby appropriately control the transmittance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electrochromic mirror comprising:
a light reflective member; and
an electrochromic device disposed on a reflective surface side of the light reflective member,
wherein the electrochromic mirror includes at least one light detection region, the at least one light detection region includes a plurality of openings defined in the light reflective member,
the electrochromic mirror is configured to control a transmittance of the electrochromic device in response to at least a portion of an amount of light in the at least one light detection region, and
the plurality of openings are three or more openings, and a figure defined by line segments connecting the openings has an area accounting for 50% or more of a total area of the light reflective member.

2. The electrochromic mirror according to claim 1, wherein the at least one light detection region includes at least one light detection unit and a light guide unit, and the light guide unit is configured to guide, to the at least one light detection unit, light having entered the at least one light detection region.

3. The electrochromic mirror according to claim 2, wherein the at least one light detection unit is a plurality of light detection units disposed so as to respectively correspond to the plurality of openings.

4. The electrochromic mirror according to claim 2, further comprising a controller configured to control the transmittance of the electrochromic device in response to an amount of light detected with the at least one light detection unit.

5. The electrochromic mirror according to claim 1, wherein the at least one light detection region includes a plurality of light detection units disposed so as to correspond to each of at least one amount-of-light variable region of the electrochromic mirror.

6. The electrochromic mirror according to claim 1, wherein the at least one light detection region includes a plurality of light detection units disposed so as to correspond to each of the plurality of openings.

7. The electrochromic mirror according to claim 1, wherein the electrochromic mirror is configured to refer to predetermined voltage-current characteristics of the electrochromic device, and
the electrochromic mirror is configured to control the transmittance of the electrochromic device with reference to an amount of light in the at least one light detection region and the voltage-current characteristics.

8. The electrochromic mirror according to claim 1, further comprising an ambient light sensor configured to detect an amount of ambient light,
wherein the electrochromic mirror is configured to control the transmittance of the electrochromic device with reference to the amount of ambient light detected with the ambient light sensor and an amount of light in the at least one light detection region.

9. An electrochromic mirror comprising:
a light reflective member;
a bezel member;
a light transmissive member disposed between the light reflective member and the bezel member; and
an electrochromic device disposed on a reflective surface side of the light reflective member,
wherein the light transmissive member is at least one light detection region,
the electrochromic mirror is configured to control a transmittance of the electrochromic device in response to at least a portion of an amount of light detected with the at least one light detection region, and
the plurality of openings are three or more openings, and a figure defined by line segments connecting the openings has an area accounting for 50% or more of a total area of the light reflective member.

10. The electrochromic mirror according to claim 9, wherein the at least one light detection region is disposed so as to surround the light reflective member.

11. The electrochromic mirror according to claim 9, wherein the at least one light detection region is a plurality of light detection regions disposed on an outer periphery of the light reflective member.

12. The electrochromic mirror according to claim 11, wherein the plurality of light detection regions each include a plurality of light detection units.

13. The electrochromic mirror according to claim 9, wherein the at least one light detection region includes at least one light detection unit and a light guide unit, and the light guide unit is configured to guide, to the at least one light detection unit, light having entered the at least one light detection region.

14. The electrochromic mirror according to claim 9, wherein the at least one light detection region each includes a plurality of light detection units.

15. An electrochromic mirror comprising:
a light reflective member; and
an electrochromic device disposed on a reflective surface side of the light reflective member,
wherein the electrochromic mirror includes at least one light detection region, the at least one light detection region includes a plurality of openings defined in the light reflective member,
the electrochromic mirror is configured to control a transmittance of the electrochromic device in response to at least a portion of an amount of light in the at least one light detection region, and
the at least one light detection region is a plurality of light detection regions ranked with priorities, and the electrochromic mirror is configured to control the transmittance of the electrochromic device with reference to an amount of light of a light detection region ranked with a higher priority.

16. The electrochromic mirror according to claim 15, further comprising a ranking unit configured to rank the light detection region with the higher priority.

\* \* \* \* \*